US007859638B2

(12) United States Patent
Hayashi et al.

(10) Patent No.: US 7,859,638 B2

(45) Date of Patent: Dec. 28, 2010

(54) METHOD FOR DRIVING LIQUID CRYSTAL LIGHT MODULATING DEVICE, AND LIQUID CRYSTAL LIGHT MODULATING DEVICE

(75) Inventors: Naoyuki Hayashi, Kanagawa (JP); Takashi Kato, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 982 days.

(21) Appl. No.: 11/707,939

(22) Filed: Feb. 20, 2007

(65) Prior Publication Data

US 2007/0195034 A1 Aug. 23, 2007

(30) Foreign Application Priority Data

Feb. 20, 2006 (JP) ............................ 2006-042724

(51) Int. Cl.
*C09K 19/02* (2006.01)
*C09K 19/60* (2006.01)

(52) U.S. Cl. ...................................... 349/179; 349/165

(58) Field of Classification Search ................ 349/165, 349/179

See application file for complete search history.

(56) References Cited

U.S. PATENT DOCUMENTS 4,278,328 A * 7/1981 Mukoh et al. ............... 349/130
5,579,142 A * 11/1996 Sawayama et al. .......... 349/177
6,108,069 A * 8/2000 Okada et al. ................ 349/179
6,924,873 B2 8/2005 Asada
2004/0246431 A1 12/2004 Asada

FOREIGN PATENT DOCUMENTS

WO WO-02/093241 A1 11/2002

* cited by examiner

*Primary Examiner*—Michael H Caley
(74) *Attorney, Agent, or Firm*—Birch, Stewart, Kolasch & Birch, LLP

(57) ABSTRACT

The present invention provides a driving method using a liquid crystal light modulating device including transparent electrodes which each have a horizontally alignment film; and a liquid crystal composition which contains at least a chiral dopant, a dichroic dye and a host liquid crystal. The transparent electrodes face each other to have a cell gap having a width of 10 μm or less therebetween. The liquid crystal composition is filled into the cell gap, and has a positive dielectric constant anisotropy. The driving method attains display-switching by (a) applying a higher voltage than a threshold voltage of the liquid crystal composition into the device so as to be transparent and colorless, (b) applying a lower voltage than a threshold voltage so as to be light-scattered white, or (c) applying no voltage so as to be colored.

14 Claims, 3 Drawing Sheets

COLORED STATE

LIGHT-SCATTERED WHITE STATE

STATE OF TRANSPARENT AND COLORLESS

METHOD FOR DRIVING LIQUID CRYSTAL LIGHT MODULATING DEVICE, AND LIQUID CRYSTAL LIGHT MODULATING DEVICE

CROSS-REFERENCE TO RELATED APPLICATION

This application claims priority under 35 USC 119 from Japanese Patent Application No. 2006-042724, the disclosure of which is incorporated by reference herein.

BACKGROUND OF THE INVENTION

1. Field of the Invention

The present invention relates to a method for driving a liquid crystal light modulating device, and a liquid crystal light modulating device, in particular, a method for driving a liquid crystal light modulating device wherein a liquid crystal composition comprising a chiral dopant and a dichroic dye is used, and a liquid crystal light modulating device.

2. Description of the Related Art

As a method for switching a light-scattered (light-shielded) state and a transparent state in liquid crystal light modulating devices, methods as described below are disclosed.

For example, "Development of Chromic Material", edited by Kunihiro Ichimura (published by CMC Publishing Co., Ltd. in 2000), pp. 226-236 discloses, as a method for switching between a state of light-scattered white and a state of transparent through applied voltage. In the method, capsules in which liquid crystals are encapsulated are dispersed into a polymer. When the circuit is opened, alignment of liquid crystals is random. Accordingly, light is reflected irregularly by difference in refractive index between liquid crystals and the polymer, thereby scattering (light shielding occurs). On the other hand, when the circuit is closed, alignment of liquid crystals is uniform. Accordingly, it is transparent by conformance in refractive index between the long axis direction of liquid crystals and the polymer. Therefore, in the method, switching can be made between a white scattered state and a transparent state by applied voltage.

However, according to this method, in order to make a liquid crystal light modulating device into a colored state, it is necessary to dissolve a dichroic dye into the liquid crystal. But the coating film of the capsules is dyed with the dichroic dye, or the dichroic dye is easily aligned along the polymer coating film so that responsiveness to the voltage is lost. Thus, the method has a problem in that when the liquid crystal is transparent, the transmittance thereof becomes low.

WO 2002/093241 discloses a method of: mixing an uncured ultraviolet-curable resin, a polymerization initiator, a liquid crystal and a dichroic dye; and radiating ultraviolet rays to the mixture to cure the resin, whereby the polymer and the liquid crystal undergo phase-separation to form an interface between the polymer and the liquid crystal, and thus a device wherein the present system is used is operated by the same principle as used in the above-mentioned liquid crystal light modulating device.

However, this method has a problem in that the dye is decomposed by the UV-radiation or with the polymerization initiator so that the colorability of the dye declines.

As described above, the driving methods of the prior art each have problems to be overcome.

SUMMARY OF THE INVENTION

A first aspect of the present invention is a method for driving a liquid crystal light modulating device comprising:

preparing a liquid crystal light modulating device comprising: transparent electrodes which each have a horizontally alignment film and face each other to have a cell gap having a width of 10 μm or less therebetween; and a liquid crystal composition which is filled into the cell gap, comprises at least a chiral dopant, a dichroic dye and a host liquid crystal, and has a positive dielectric constant anisotropy; and (a) applying a higher voltage than the threshold voltage of the liquid crystal composition into the liquid crystal light modulating device so as to be transparent and colorless, (b) applying a lower voltage than a threshold voltage of the liquid crystal composition into the liquid crystal light modulating device so as to be light-scattered white, or (c) applying no voltage into the liquid crystal light modulating device so as to be colored, thereby attaining display-switching.

DETAILED DESCRIPTION OF THE INVENTION

The present invention will be described in detail below. In the present specification " . . . to . . . " represents a range including the numeral values represented before and after "to" as a minimum value and a maximum value, respectively.

A driving method according to the present invention uses a liquid crystal light modulating device including transparent electrodes which each have a horizontally alignment film; and a liquid crystal composition which contains at least a chiral dopant, a dichroic dye and a host liquid crystal. The transparent electrodes face each other to have a cell gap having a width of 10 μm or less therebetween. The liquid crystal composition is filled into the cell gap, and has a positive dielectric constant anisotropy.

The driving method according to the present invention switches display by (a) applying a higher voltage than a threshold voltage of the liquid crystal composition into the device so as to be transparent and colorless, (b) applying a lower voltage than a threshold voltage so as to be light-scattered white, or (c) applying no voltage so as to be colored.

With reference to FIG. 1, the principle of this method will be described hereinafter.

Figures 1A, 1B, 1C:
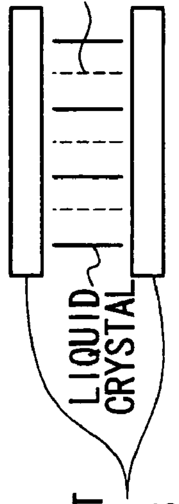
FIG. 1A is a view illustrating a state of transparent and colorless in the method for driving a liquid crystal light modulating device according to the present invention.
FIG. 1B is a view illustrating a state of light-scattered white in the method for driving a liquid crystal light modulating device according to the invention.
FIG. 1C is a view illustrating a colored state in the method for driving a liquid crystal light modulating device according to the invention.

As illustrated in FIG. 1A, in a case in which a liquid crystal having a positive $\Delta\epsilon$ is used, the liquid crystal turns into a homeotropic alignment (an alignment state perpendicular to transparent electrode substrates) when applying a larger voltage than the threshold voltage of the liquid crystal into the present device. Accordingly, the device becomes transparent and colorless, since a dichroic dye does not absorb light.

On the other hand, as illustrated in FIG. 1C, in a case in which the applied voltage is cut off, the liquid crystal turns into a planar alignment (an alignment state horizontal to the transparent electrode substrates) by action of horizontally alignment films. Accordingly, the device becomes a colored state, since the dichroic dye absorbs light having a specific wavelength.

Further as illustrated in FIG. 1B, in a case in which a voltage smaller than the threshold voltage is applied to the device, both of twisting power depending on a chiral dopant and a change in the alignment of the liquid crystal depending on the generated electric field may act so that vibration of molecules of the liquid crystal is induced. Thus, the dichroic dye also vibrates. However, the dichroic dye hardly absorbs light since the dichroic dye is not aligned horizontally. It is presumed that this matter causes the liquid crystal composition to turn into a state of light-scattered white.

When the width of the cell gap is 10 μm or less, a state of light-scattered white as illustrated in FIG. 1B can be effectively exhibited. The reason therefor is unclear, but is presumed as follows: the influence of the alignment films becomes greater when the cell gap width is 10 μm or less, and a difference between the behavior of the liquid crystal molecules and that of the dichroic dye becomes large.

The cell gap width is preferably from 2 μm to 10 μm, and more preferably from 6 μm to 8 μm. The cell gap (i.e., the interval between the electrode substrates) can be adjusted by use of a spacer or the like.

(Driving for Making the Liquid Crystal Composition Transparent and Colorless)

The applied voltage in order to make the liquid crystal composition transparent and colorless may be either DC voltage or AC voltage. The waveform thereof may be any waveform such as a rectangular form, a triangular form or a sine form. The frequency thereof is not limited to any specific range.

Figure 2:
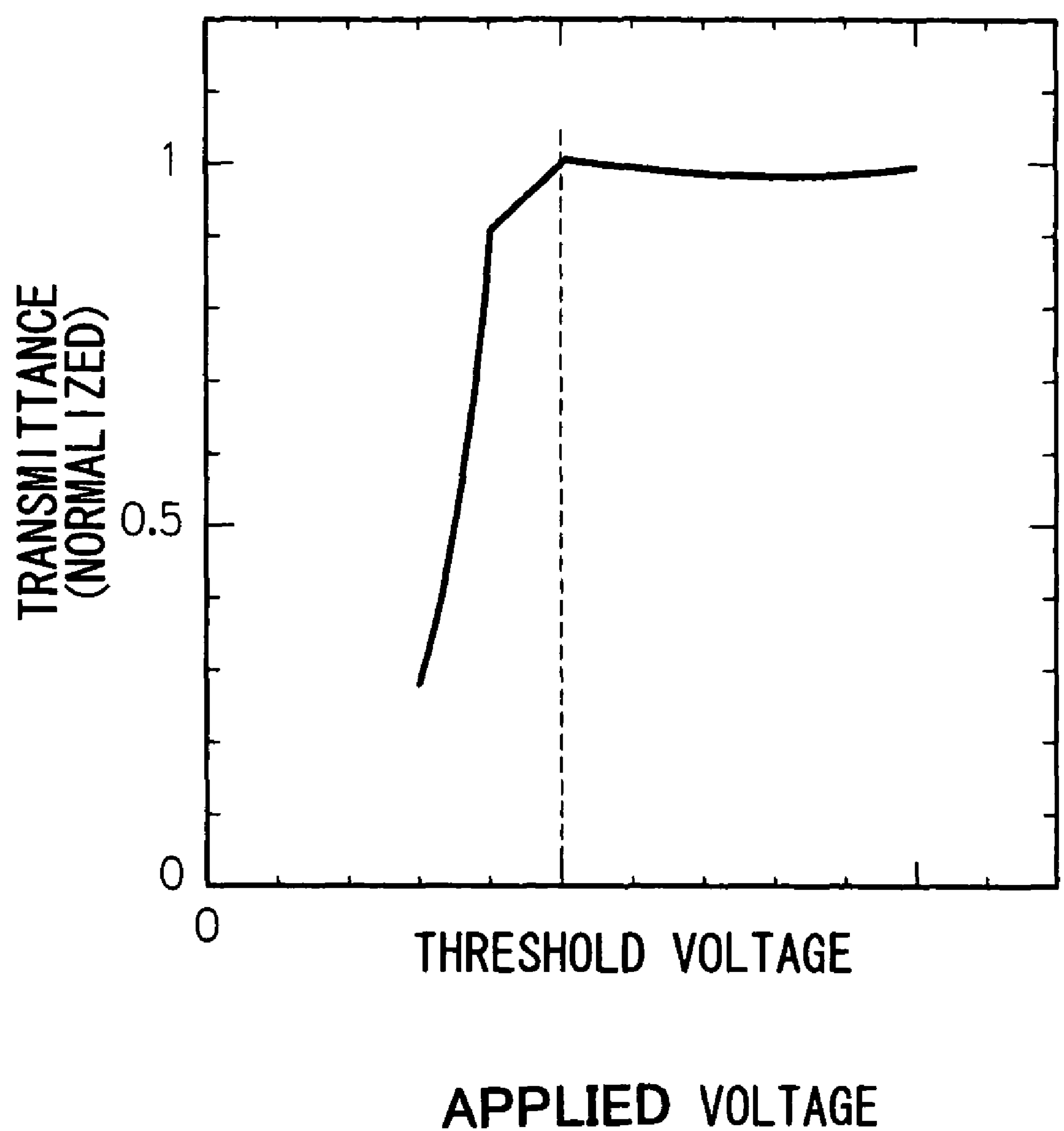
FIG. 2 is a graph for explaining the definition of threshold voltage.

The voltage to be applied needs to be higher than the threshold voltage of the liquid crystal composition, and should be appropriately set in accordance with the concentration of the chiral dopant, the dielectric constant property of the liquid crystal, and the distance between the electrodes. As illustrated in FIG. 2, the "threshold voltage" means a minimum applied voltage when a transmittance of the liquid crystal which is normalized by use of a saturated value thereof becomes 1.

(Driving for Making the Liquid Crystal Composition into a State of Light-Scattered White)

The voltage applied for making the liquid crystal composition into a state of light-scattered white may be DC voltage or AC voltage. The waveform thereof may be any waveform such as a rectangular form, a triangular form or a sine form. The frequency thereof is not limited into any specific range.

When a higher voltage than the threshold voltage of the liquid crystal composition is applied to the composition, the composition turns into transparent and colorless; therefore, the voltage applied for making the composition into a state of light-scattered white is set to a lower voltage than the threshold voltage of the liquid crystal composition. The absolute value of the applied voltage should be appropriately set in accordance with the concentration of the chiral dopant in the composition, the dielectric constant property of the liquid crystal, and the distance between the electrodes.

The voltage to be applied is preferably from 0.1 to 0.9 times with respect to the threshold voltage, and more preferably from 0.3 to 0.8 times the threshold voltage. If the applied voltage is less than 0.1 times with respect to the threshold voltage, the vibration of the liquid crystal molecules based on the electric field is reduced so that the liquid crystal composition turns into a substantially colored state by alignment-regulating force based on the horizontally alignment films. If the applied voltage is more than 0.9 times with respect to the threshold voltage, the alignment of the liquid crystal becomes a substantially homeotropic alignment. As a result, the state of light-scattered is weak so that the liquid crystal composition unfavorably turns into a state substantially equivalent to a state of transparent and colorless.

(Driving for Making the Liquid Crystal Composition into a Colored State)

When the applied voltage, so as to be a state of transparent and colorless or a state of light-scattered white, is cut off, the long axes of the liquid crystal and the dichroic dye become parallel to the transparent electrode substrates by the alignment-regulating force of the alignment films. As a result, the dye absorbs light.

The following will describe the structure of a light modulating device which can be used for the light modulating device driving method of the invention.

A liquid crystal light modulating device according to the present invention includes: transparent electrodes which each have a horizontally alignment film; and a liquid crystal composition which contains at least a chiral dopant, a dichroic dye and a host liquid crystal. The transparent electrodes are opposed to each other to have a cell gap having a width of 10 μm or less therebetween. The liquid crystal composition is filled into the cell gap, and has a positive dielectric constant anisotropy. A liquid crystal light modulating device can be switched among (1) a state of transparent and colorless, (2) a state of light-scattered white, and (3) a colored state, each other.

It is preferable to set the voltage applied for making the liquid crystal composition into a state of transparent and colorless to a higher voltage than the threshold voltage of the liquid crystal composition, set the voltage applied for making the composition into a state of light-scattered white to a lower voltage than the threshold voltage, and set the voltage applied for making the composition into a colored state to zero. The voltage applied for making the composition into a state of light-scattered white is more preferably from 0.1 to 0.9 times with respect to the threshold voltage.

In the liquid crystal light modulating device of the invention, a liquid crystal composition is filled into a cell gap between transparent electrodes opposed to each other. The transparent electrodes may be made of a material which is appropriately selected from known materials, such as ITO.

The liquid crystal composition is contained at least a chiral dopant, a dichroic dye and a host liquid crystal.

The chiral dopant may be used a chiral dopant for TN or STN which is described in "Liquid Crystal Device Handbook" (edited by Japan Society for the Promotion of Science, 142 Committee, and published by the Nikkan Kogyo Shimbun, Ltd. in 1989), pp. 199-202. Specific examples thereof including products manufactured by Merck (trade names: R-1011, S-1011, R-811, S-811, and CB 15), products manufactured by Asahi Denka Kogyo K.K. (trade names: CNL-611, CNL-617, CNL-686, CNL-687, CNL-688, CNL-689, CNL-690, CNL-691, and CNL-699), and other known products are appropriately selected.

The content by percentage of the chiral dopant is from 0.1 to 40% by mass with respect to the total of the liquid crystal composition. Specifically, the content needs to be changed in accordance with the HTP (Helical Twisting Power) value of the chiral dopant, which represents the twisting power of the dopant. In order to prevent selective reflection of visible wavelengths (of 0.8 μm or less) when the liquid crystal composition is in a colored state, the content by percentage of the chiral dopant with respect to the total of the liquid crystal composition satisfies the following relational expression:

$$C<n/(\mathrm{HTP}\times 0.8)$$

wherein n: the average refractive index of the liquid crystal, and HTP: the HTP value (unit: $\mu m^{-1}$) of the chiral dopant.

The dichroic dye may be appropriately selected from known dichroic dyes, examples of which include azo dyes, anthraquinone dyes, perylene dyes, melocyanine dyes, azomethine dyes, phthaloperylene dyes, indigo dyes, azulene dyes, dioxazine dyes, and phenoxazine dyes. From the viewpoint of a high dichroism, azo dyes, anthraquinone dyes and phenoxazine dyes are particularly preferable.

The content by percentage of the dichroic dye is preferably from 0.1 to 20% by mass with respect to the total of the liquid crystal composition, more preferably from 1.0 to 10% by mass thereof. If the content is less than 0.1% by mass, light absorption of the dye is reduced so that the coloring of the dye in a colored state is weak. Consequently, the contrast becomes small. If the content is more than 20% by mass, (1) the viscosity of the liquid crystal becomes high so that the responsibility speed unfavorably becomes slow and (2) light absorption of the dye in a state of transparent unfavorably becomes large due to absorbing factors of the dye in the direction of the short axis thereof.

The host liquid crystal that can be used is appropriately selected from known liquid crystals such as nematic liquid crystal and smectic liquid crystal. Nematic liquid crystal is particularly preferred from the viewpoint of responsibility speed. In order to make the light-scattered degree of the composition in a state of light-scattered white high to lower the transmittance, it is preferred to use a host liquid crystal having a large birefringence. The birefringence (Δn) of the host liquid crystal is preferably from about 0.1 to 0.3, more preferably from about 0.15 to 0.3.

Preferable specific examples of the host liquid crystal include products manufactured by Merck (trade names: E7, E90, MLC-6621-000, and MLC-6621-100), and products manufactured by Asahi Denka Kogyo K.K. (trade names: HA-11757C, HA-11756C, and HA-11731C), or mixtures thereof.

Besides, known additives may be incorporated into the liquid crystal composition, examples of the additives including a spherical spacer, an ultraviolet absorbent, and an antioxidant.

In the liquid crystal light modulating device according to the invention, a support, an alignment film, an ultraviolet inhibiting film, an antireflection film, a gas barrier layer, a sealant and so forth can be used, besides transparent electrodes and liquid crystal compositions.

EXAMPLES

The present invention will be more specifically described by way of the following examples. Raw materials, reagents, the amounts of the materials, and the composition of the materials, operations and so on described in the examples can be appropriately varied as long as examples where they are varied do not depart from the subject matter of the invention. Accordingly, the scope of the invention is not limited to the following specific examples.

(Production of a Device)

Prepared was a liquid crystal evaluating cell (manufactured by the Optronics Co., Ltd.) wherein ITO substrates (100Ω/□), each having a surface on which horizontally oriented film rubbed is applied and baked, were composed to each other so as to have a cell gap having a width of 8 μm therebetween. Into a nematic liquid crystal (trade name: ZLI-1132, manufactured by Merck, Δ∈: 13.1, Δn: 0.140) as a host liquid crystal were dissolved 2% by mass of a chiral dopant (trade name: R-1011, manufactured by Merck) and 1.5% by mass of an anthraquinone dye illustrated below as a dichroic dye. In this way, a liquid crystal composition was prepared. This liquid crystal composition was injected into the above-mentioned liquid crystal cell to produce a device.

The threshold voltage of the liquid crystal composition was 20 V This device turned into state of a transparent and colorless by applying a rectangular wave having a frequency of 100 Hz and a voltage of ±20V thereto.

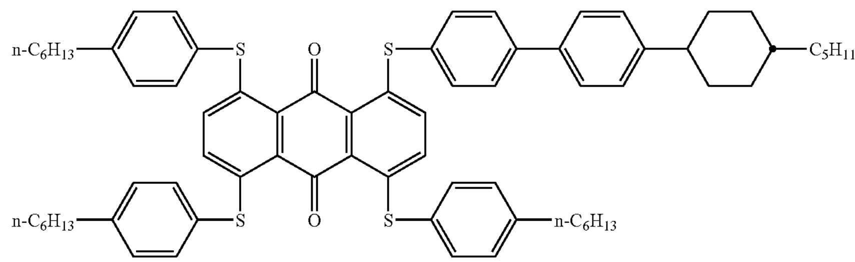

Example

Figure 3:
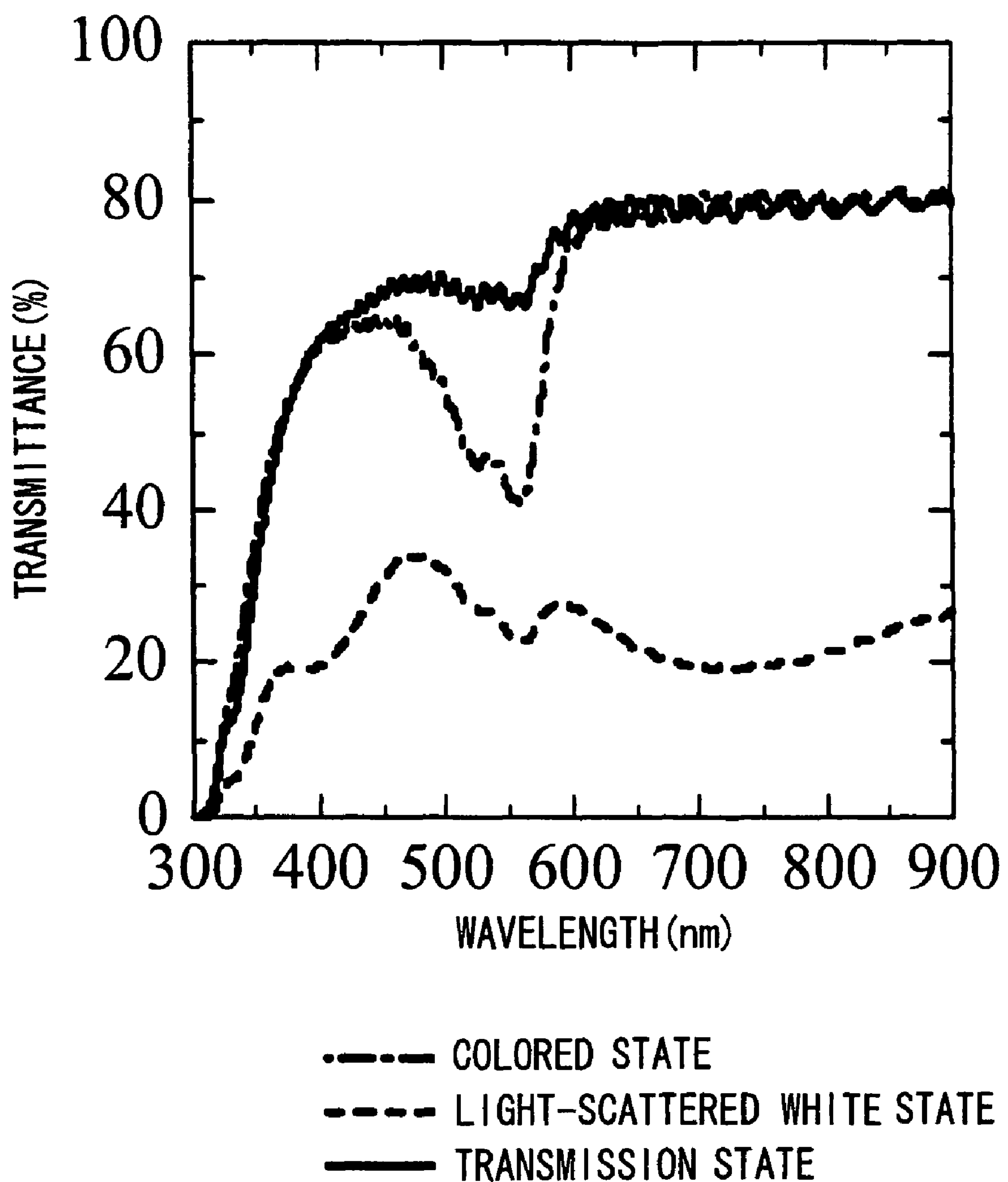
FIG. 3 is a graph showing transmittance versus wavelength when a device in a working example is in a state of transparent and colorless, in a state of light-scattered white, or in a colored state.

The transmittance of the produced liquid crystal light modulating device was measured with a spectrophotometer (trade name: UV-2400, manufactured by Shimadzu Corp.) while a rectangular wave having a frequency of 100 Hz and a voltage of ±20 V was applied to the device. As a result, the liquid crystal composition was not colored, and a high transparency was realized, as represented by a solid line in FIG. 3.

Next, a rectangular wave having a frequency of 100 Hz and a voltage of ±10 V was applied to the device. In this state, the transmittance was reduced at the whole of used wavelengths, and a state of light-scattered white was appeared as represented by a dot line in FIG. 3. As represented by an alternate long and short dash line in FIG. 3, when the voltage was cut off, a state of light absorbed was realized. In the state of light absorbed, the liquid crystal composition had an absorption peak wavelength at 560 nm.

Comparative Example

A liquid crystal light modulating device was produced in the same way as in the above-mentioned Example except that the same liquid crystal composition as described in the Example was injected into a cell (manufactured by the E. H. C Co., Ltd.) wherein ITO substrates (100Ω/□), each having a surface on which horizontally alignment film is applied, baked, and rubbed, were composed to each other so as to have a cell gap having a width of 25 μm therebetween.

A rectangular wave having a frequency of 100 Hz and a voltage of ±65 V was applied to the produced liquid crystal light modulating device, so that a state of transparent that the liquid crystal composition was not colored was appeared. In cases where a rectangular wave having a frequency of 100 Hz and a voltage of ±30 V was applied to the device and in cases where any voltage was cut off, the dye absorbed light and further light was scattered.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for driving a liquid crystal light modulating device comprising:

preparing a liquid crystal light modulating device comprising:

transparent electrodes which each have a horizontally alignment film and face each other to have a cell gap having a width of 10 μm or less therebetween; and a liquid crystal composition which is filled into the cell gap, wherein said liquid crystal composition comprises at least a chiral dopant, a dichroic dye, and a host liquid crystal, the content by percentage of the chiral dopant with respect to the total of the liquid crystal composition being defined by the following formula:

$$C<n/(\mathrm{HTP}\times 0.8)$$

in which C represents the content by percentage of the chiral dopant, n represents the average refractive index of the liquid crystal, and HTP represents the HTP value (unit: $\mu m^{-1}$) of the chiral dopant, and wherein said liquid crystal composition has a positive dielectric constant anisotropy; and (a) applying a higher voltage than the threshold voltage of the liquid crystal composition into the liquid crystal light modulating device so as to be transparent and colorless, (b) applying a lower voltage than a threshold voltage of the liquid crystal composition into the liquid crystal light modulating device so as to be light-scattered white, or (c) applying no voltage into the liquid crystal light modulating device so as to be colored, thereby attaining display-switching.

2. The method for driving a liquid crystal light modulating device according to claim 1, wherein the applied voltage for light-scattered white is from 0.1 to 0.9 times with respect to the threshold voltage.

3. The method for driving a liquid crystal light modulating device according to claim 1, wherein said dichroic dye is an anthraquinone dye.

4. The method for driving a liquid crystal light modulating device according to claim 3, wherein said anthraquinone dye has the formula

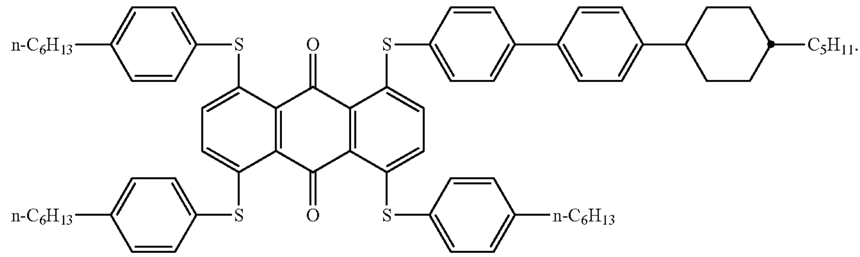

5. A liquid crystal light modulating device, which can be switched among a state of transparent and colorless, a state of light-scattered white, and a colored state, comprising:

transparent electrodes which each have a horizontally alignment film and face each other to have a cell gap having a width of 10 μm or less therebetween; and a liquid crystal composition which is filled into the cell gap, wherein said liquid crystal composition comprises at least a chiral dopant, a dichroic dye, and a host liquid crystal, the content by percentage of the chiral dopant with respect to the total of the liquid crystal composition being defined by the following formula:

$$C<n/(\mathrm{HTP}\times 0.8)$$

in which C represents the content by percentage of the chiral dopant, n represents the average refractive index of the liquid crystal, and HTP represents the HTP value (unit: $\mu m^{-1}$) of the chiral dopant, and wherein said liquid crystal composition has a positive dielectric constant anisotropy.

6. The liquid crystal light modulating device according to claim 5, further comprising a controlling unit that controls an applied voltage by (a) applying a higher voltage than the threshold voltage of the liquid crystal composition into the liquid crystal light modulating device so as to be transparent and colorless, (b) applying a lower voltage than a threshold voltage of the liquid crystal composition into the liquid crystal light modulating device so as to be light-scattered white, or (c) applying no voltage into the liquid crystal light modulating device so as to be colored, thereby attaining display-switching.

7. The liquid crystal light modulating device according to claim 5, wherein the applied voltage for the state of light-scattered white is 0.1 to 0.9 times with respect to the threshold voltage.

8. The liquid crystal light modulating device according to claim 5, wherein the content by percentage of the chiral dopant is from 0.1 to 40% by mass with respect to the total of the liquid crystal composition.

9. The liquid crystal light modulating device according to claim 5, wherein the content by percentage of the dichroic dye is from 0.1 to 20% by mass with respect to the total of the liquid crystal composition.

10. The liquid crystal light modulating device according to claim 5, wherein the content by percentage of the dichroic dye is from 1.0 to 10% by mass with respect to the total of the liquid crystal composition.

11. The liquid crystal light modulating device according to claim 5, wherein the host liquid crystal is a nematic liquid crystal.

12. The liquid crystal light modulating device according to claim 5, wherein a birefringence of the host liquid crystal is from 0.1 to 0.3.

13. The liquid crystal light modulating device according to claim 5, wherein said dichroic dye is an anthraquinone dye.

14. The liquid crystal light modulating device according to claim 13, wherein said anthraquinone dye has the formula

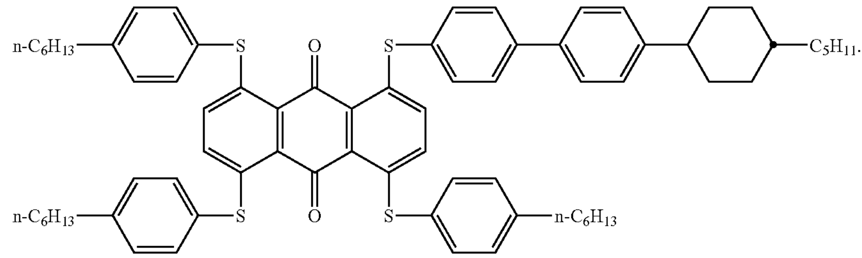

* * * * *